United States Patent [19]

Martin

[11] 3,802,346
[45] Apr. 9, 1974

[54] SOLID GRAIN STRESS RELIEF LINER
[76] Inventor: John T. Martin, 3227 Ferndale, Waco, Tex. 76706
[22] Filed: Oct. 16, 1969
[21] Appl. No.: 870,003

Related U.S. Application Data
[63] Continuation of Ser. No. 689,554, Dec. 11, 1967, abandoned.

[52] U.S. Cl. .............................................. 102/103
[51] Int. Cl. ............................................. F42b 1/00
[58] Field of Search .................................. 102/103; 94/18–18.2; 14/16; 60/255

[56] References Cited
UNITED STATES PATENTS
| | | | |
|---|---|---|---|
| 1,730,066 | 10/1929 | Fischer | 94/18.2 |
| 2,065,521 | 12/1936 | Fischer | 94/18.2 |
| 2,065,522 | 12/1936 | Fischer | 94/18.2 |
| 2,085,168 | 6/1937 | Payne | 94/18 X |
| 3,263,613 | 8/1966 | Rice et al. | 102/98 |
| 3,397,856 | 8/1968 | Sullivan et al. | 14/16 |
| 3,407,595 | 10/1968 | Peterson | 102/103 |

Primary Examiner—Robert F. Stahl
Attorney, Agent, or Firm—L. Lee Humphries; Robert M. Sperry

[57] ABSTRACT

A liner assembly for bonding a combustible solid grain to a casing. A perforated sheet is positioned between layers of liner material bonded to the casing and grain. Stretchable columns of liner material occupy the spaces defined by the holes of the apertured sheet and can "neck-down" when the grain is experiencing thermal shrinkage. The stretching action alleviates internal grain stress that otherwise would cause cracks in the grain and possible destruction.

7 Claims, 7 Drawing Figures

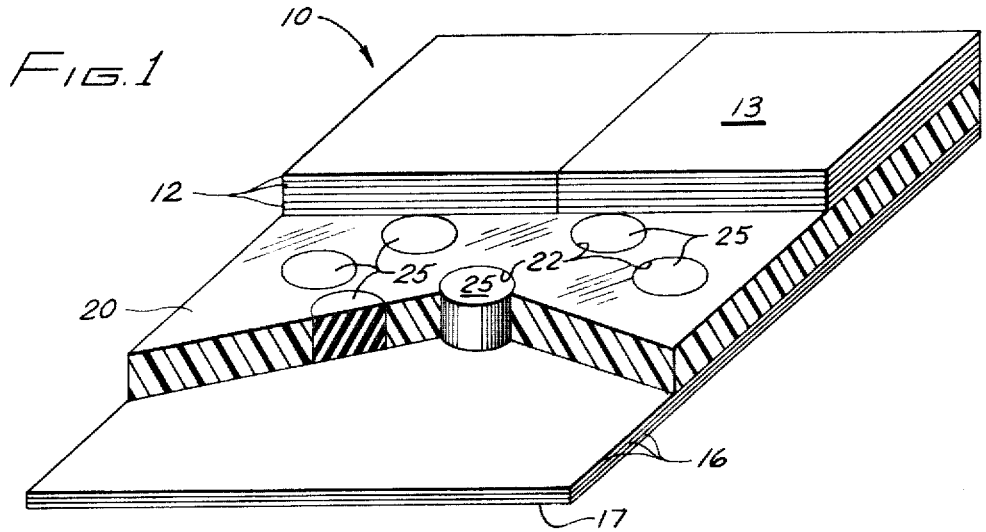
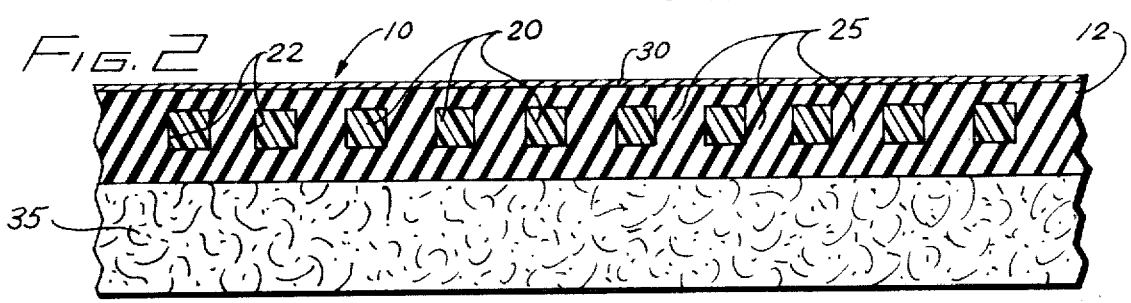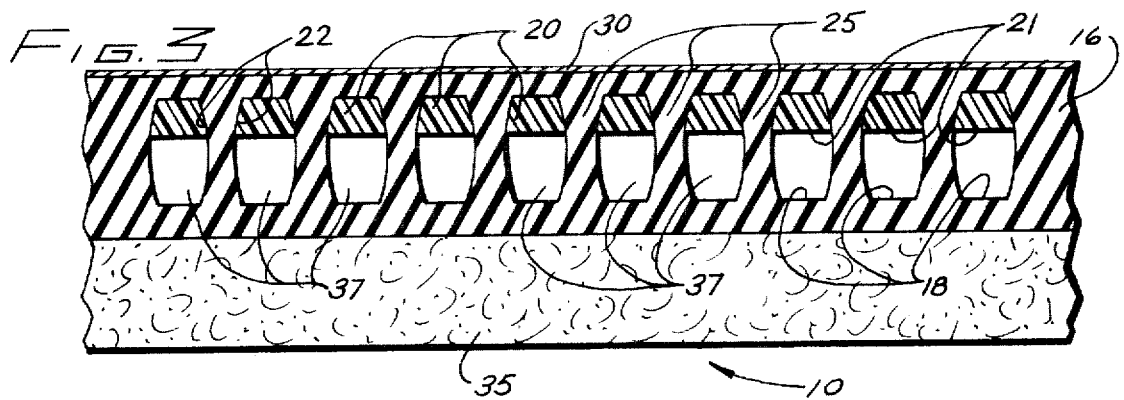

INVENTOR.
JOHN T. MARTIN
BY John E. Kelly
ATTORNEY

SOLID GRAIN STRESS RELIEF LINER

This application is a continuation of application Ser. No. 689,554 which is now abandoned.

BACKGROUND OF THE INVENTION

This invention relates to a liner assembly interposed between a solid grain and its metal casing, the purpose of the liner being to relieve stress engendered in the grain during chilldown and thermal shrinkage which would tend to crack and destroy the grain.

Encased solid grains may be used to generate gases. These grains may be incorporated in rocket motors to generate thrust for propelling a vehicle to which the rocket motor is coupled. It is customary to position a liner between a solid grain and its casing, the latter ordinarily fabricated from steel, so as to insulate the casing from the grain as it is being combusted. Unless the casing is shielded from the intense combustion heat, it is likely to deform, melt, and eventually become destroyed. After the grain has been cast and cured within its casing, its temperature may be decreased to temperatures in order of −70°F so as to be prepared for its intended environment. As the grain temperature is diminished far below its maximum curing temperature which may be in the order of +170°F, conventional liners are incapable of freely stretching to relieve stresses induced due to the fact that the grain is contracting. In the case, for example, of internal burning grains, i.e., cylindrically shaped grains with axially extending bores that constitute the initial burning surface, chilling down the grain will cause cracks to develop and become propagated on the inside grain wall defined by the bore. This results because as the grain shrinks and is incapable of pulling away from the casing, the actual change in dimension, i.e., strain, must be experienced at the grain inner surface. If there are cracks in the grain at the time of ignition, then too much grain surface will be burned causing excessive pressurization and either very erratic combustion patterns or destruction. To avoid this harmful consequence, attempts have been made to fabricate a liner capable of both insulating the casing and relieving the grain of excessive stress likely to induce cracks in the grain.

One approach was to incorporate in the liner a layer of continuous honeycomb configuration coated with a release agent. The configuration was intended to yield inwardly to permit the grain to pull away from the facing during cooling periods. When tested in motors, however, no stress relief was obtained.

Another approach was to fabricate a liner of spongy material which would yield to allow the grain to withdraw from the casing. In this liner it was difficult to calculate the degree of stress relief for a particular radial elongation by the sponge. Also the sponge being compressible both radially inwardly and radially outwardly would allow the grain to become split during ignition shock or other severe vibrations because radial outward straining under ignition pressurization would not be prevented by the sponge liner.

SUMMARY OF THE INVENTION

Briefly stated this invention contemplates a liner assembly for bonding together at least portions of a solid grain and the casing for packaging the grain. Between a layer of liner material bonded to the grain and another layer of liner material bonded to the interior wall of the casing is positioned a perforated sheet. Additional liner material is disposed in the holes formed in the perforated sheet, this liner material constituting a plurality of stretchable columns. The columns together with the two layers of liner material are merged together as an integral unit. After the grain has been cast and cured, the columns occupy substantially the entire spaces constituted by the holes in the sheet. When the grain is subjected to decreasing temperatures causing the grain to thermally shrink, the columns "neckdown" permitting the grain to withdraw radially inwardly from the casing. By this arrangement, severe internal stresses that otherwise would be engendered in the grain are alleviated and therefore the formation of cracks is arrested. By greatly reducing or eliminating the internal stress caused by the strain, the physical integrity of the grain is preserved. In addition to achieving stress relief for the grain, the liner assembly also insulates the casing from the combustion product generated by the burning grain and provides support for the grain when it is subjected to ignition or combustion shock as well as severe vibrations. Hence the liner assembly is anisotropic in that it is incompressible in one direction (radially outwardly) so as to furnish the necessary support for the grain and is yieldable in the other direction (radially inwardly) due to the fact that the stretchable columns neck-down to achieve stress relief for the grain.

BRIEF DESCRIPTION OF THE DRAWINGS

The unique aspects and advantages of the instant invention will be fully understood when the following detailed description is studied in conjunction with the drawings in which:

FIG. 1 is a perspective sectional view of a segment of the liner assembly showing stretchable columns of liner material filling the holes of the perforated sheet.

FIG. 2 is a cross-sectional view of the casing, liner assembly, and grain when the grain is in its unstressed condition.

FIG. 3 is a cross-sectional view similar to that shown in FIG. 2 when the grain is being subjected to stress induced by thermal shrinkage.

DESCRIPTION OF THE PREFERRED EMBODIMENTS

Figure 4:
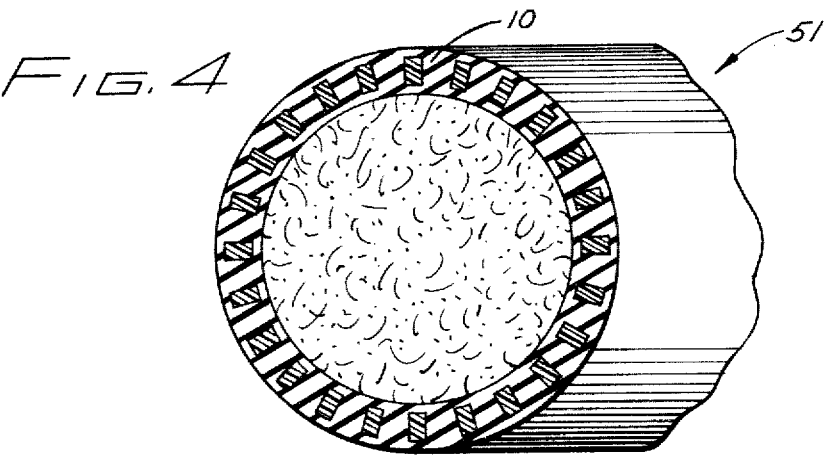
FIG. 4 is a sectional view of a grain assembly incorporating the liner assembly.

Referring now to the drawings, FIG. 1 illustrates a section of a liner assembly 10 to be disposed between a metal casing (not shown) and a solid grain (not shown) which when burned generates gases in a conventional manner. In addition to insulating the casing from burning combustion product and bonding the casing and grain together, liner assembly 10 functions to relieve stress in the grain to minimize or eliminate the development of cracks in the grain. A plurality of liner material films 12 are stacked together and are separated from another stack of liner material films 16 by a perforated sheet 20. The innermost film surface 17 of films 16 is to be bonded against the interior surface of the casing. In a similar manner, outermost film surface 13 of the stack of liner material films 12 is to be bonded to the exterior surface of the solid grain. The thicknesses of the stacks of liner material films 12 and 16 are built up so that their combined thicknesses along with that of perforated sheet 20 will be sufficient to fill the gap that would otherwise exist between the casing and grain. After liner assembly 10 has been positioned and bonded to the casing and the solid grain has been cast and cured in accordance with conventional techniques, the grain is effectively bonded to the casing. The stacks of liner material films 12 and liner material films 16 are integrally united by way of a series of columns 25. At the conclusion of the curing process and under ambient conditions columns 25 substantially entirely occupy the spaces constituted by holes 22 of perforated sheet 20. Holes 22 are preferably aligned radially from the cylindrical grain. Since columns 25 fill holes 22 and the material from which perforated sheet 20 is made is incompressible, the composite liner assembly 10 is incompressible when the grain experiences pressurization. More specifically, liner assembly 10 provides maximum support to assure structural integrity of the grain when it is subjected to compression that may be caused by ignition or vibrations. If liner assembly 10 were compressible, then the grain when subjected to internal compressive stresses would expand, develop cracks, and then either experience erratic burning or destruction. Most conventional liners are capable of preventing this type of harm.

However, another serious problem exists that can rupture and destroy a grain which occurs during chilldown situations when the grain is subjected to temperatures far below its maximum curing temperature. Conventional liners are incapable of allowing the grain to be displaced radially inwardly from the casing. As a result, stress build-up is concentrated at interior portions of the grain. In an end burning grain, stresses build up near the propellant/liner bond. These stresses are great enough to (1) cause the propellant/liner bond to fail or (2) initiate failure within the propellant grain. Both produce increased burning surface and lead to motor failure.

Potential cracking at interior portions of the grain is prevented in accordance with the instant invention due to the fact that columns 25 automatically neck-down when the grain is experiencing shrinking. Therefore, the stress concentrations are greatly minimized, if not eliminated, and cracks cannot be developed. FIG. 2 illustrates liner assembly 10 positioned between a casing 30 and a solid grain 35 when the grain 35 is free from stress. In this condition, stretchable columns 25 are captivated within the holes 22 of perforated sheet 20. During conditions of thermal shrinkage, when tensile stress is experienced by grain 35, as illustrated in FIG. 3, columns 25 neck-down permitting grain 35 to withdraw from casing 30. The elongation of columns 25 cause spaces 37 to be formed between the inner surface 21 area of perforated sheet 20 and the adjacent surface 18 of liner material films 12. It can now be seen that the neck-down action of columns 25 permits liner assembly 10 to function as a thermal contraction coupling to relieve harmful internal stresses in grain 35.

It should be understood that conventional liners are incapable of yielding radially inwardly in reaction to thermal shrinkage. Typical rubber liners possess uniaxial elongations ranging from 200 – 800 percent of their unstressed lengths and moduli ranging from 60 – 100 psi. Although it may seem that rubber liners would elongate to relieve stresses in the grain, this is not the case. Rubbery materials are incompressible; i.e., their volume does not change on stretching. In uniaxial tests the sides of the rubber specimen are free to neck-down as the specimen is pulled and large elongations are possible without an increase in volume. With respect to encased solid grains, the liner material is bonded to the rigid metal case and, therefore, necking-down is impossible except over relatively inconsequential zones near the ends of the grain.

The stress relief liner of the instant invention is thus anisotropic, i.e., it elongates in one direction (radially inwardly) when the grain thermally shrinks but remains incompressible in the opposite direction (radially outwardly) when the grain is pressurized at ignition or subjected to severe vibrations, etc. The liner assembly possesses the optimum characteristics of being able to relieve stress to prevent grain failure during thermal shrinkage, while maintaining the maximum support to insure structural integrity during vibration and ignition. The liner assembly can be modified to satisfy predetermined design needs by: (1) varying the locations of the perforated sheet; (2) varying the perforation pattern and hole shapes and sizes per unit area, e.g., the holes could be staggered elongated rectangular slots; (3) varying the thicknesses of the stacks of liner material films as well as the perforated sheet; and (4) judiciously selecting the material for the stacks of liner material films and the perforated sheet.

In another embodiment (not shown) the outer stack of liner material film 16 shown in FIG. 2 may be eliminated. In this arrangement the radially outward ends of columns 25, rather than being bonded to films 16 would be directly attached to casing 30. Perforated sheet 20 may be adhered to either stack 12 or stack 16 or alternatively may be unattached. When perforated sheet 20 is unattached to the liner material, then it is positioned to freely float between the casing 30 and grain 35 during necking-down action.

The liner material films 12 and 16, as well as the stretchable columns 25, can be fabricated from any suitable material such as (1) an elastomeric liner based on carboxy terminated polybutadiene and imine curative, or (2) elastomers derived from EPT (ethylene-propylene-terpolymers) and cured with organic peroxides.

Other materials that could be satisfactorily used are (1) natural rubber, (2) any synthetic rubber, (3) non-rigid plastics. Perforated sheet 20 may be fabricated from any suitable material such as silicone, rubber, teflon, polypropylene, or polyethylene.

Figure 6:
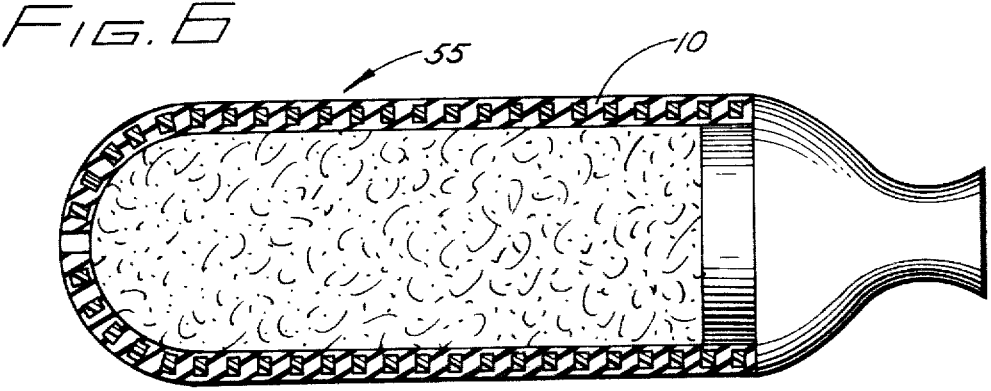
FIG. 6 is a longitudinal view of another grain assembly incorporating the liner assembly.
Figure 5:
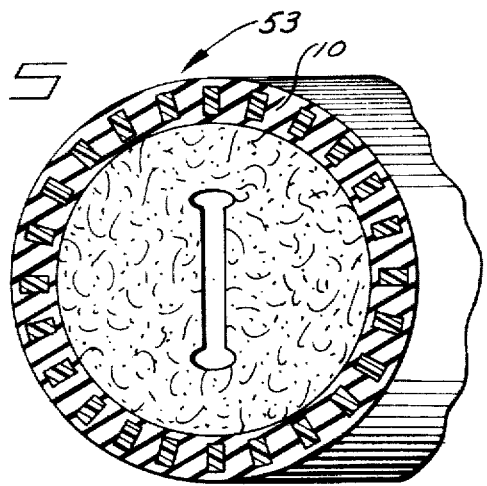
FIG. 5 is a cross-sectional view of another grain assembly incorporating the liner assembly.
Figure 7:
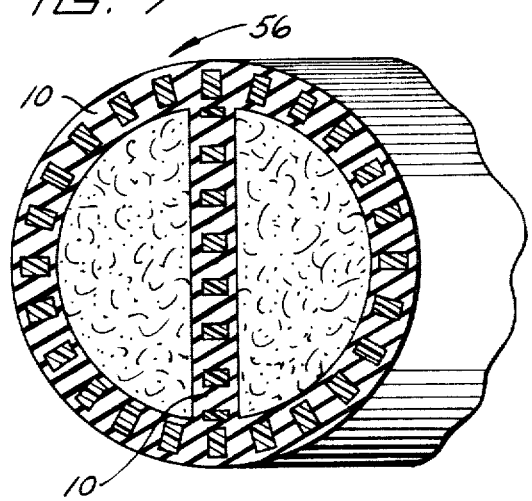
FIG. 7 is a cross-sectional view of another grain assembly incorporating the liner assembly.

One of the numerous practical uses for a liner assembly formed in accordance with this invention is illustrated in FIG. 4 where liner assembly 10, in the shape of a tube, is inserted between the solid grain and casing of a grain assembly 51 of the radial burning type. FIG. 5 illustrates that liner assembly 10 may be used for bonding together only a portion of the grain and casing of a solid grain assembly 53 having an irregular shaped central bore. FIG. 6 illustrates liner assembly 10 incorporated in an end-burning solid grain rocket motor 55. FIG. 7 shows that liner assembly 10 may be used to divide half sections of a solid grain assembly 56. Those acquainted with solid grain technology will envision numerous other specific applications for the liner assembly formed in accordance with this invention.

The stress relieving concept explained above is not limited to use in grains or other annular shaped objects and may be used in different types of expansion joints. For example, liner assembly 10 could be incorporated between adjacent concrete slabs or between assembled components of other structural material.

I claim:

1. A stress relief liner for bonding one body to another body, comprising:
   a first body;
   a second body spaced from the first body;
   a sheet having a plurality of perforations positioned between the bodies;
   a mass of liner material positioned between the first and second bodies and bonded thereto, an integral portion of the liner material extending from one face of said sheet to the other face through said perforations; said sheet having at least one face unattached to said mass,
   said portion of liner material constituting stretchable columns disposed in the perforations and unbonded to the walls of the perforations, the columns being oriented to elongate when the bodies become separated from one another to relieve stress in the bodies.

2. The structure according to claim 1 wherein a portion of the liner material forms a layer bonded to one of the bodies and the stretchable columns are directly bonded to the other body.

3. The structure according to claim 1 wherein the sheet is arranged relative to the bodies and mass of liner material so that when the columns are elongated the sheet may become freely displaceable between the bodies.

4. A stress relief liner assembly for bonding a solid propellant grain to a casing, the liner assembly comprising:
   a liner material positioned between the solid grain and casing, a surface portion of the liner material being bonded to the grain and another surface portion of the liner material being bonded to the casing;
   a perforated sheet disposed in the liner material, and generally parallel therewith; at least one face of said sheet being unbonded to said liner material;
   said liner material including stretchable columns occupying the space defined by the perforations in said sheet, said columns being unbonded to the walls of said perforations, the columns being oriented to elongate when the grain is subjected to thermal shrinkage to relieve stress in the grain.

5. The structure according to claim 4 wherein the grain is of circular cross section and the perforations are aligned radially.

6. The structure according to claim 4 wherein the sheet is positioned so that when the grain is subjected to thermal shrinkage, the distance between the grain and sheet is enlarged.

7. The structure according to claim 4 in which said sheet is made of an incompressible material so that the grain is supported by the liner assembly when the grain is pressurized and moves radially outwardly.

* * * * *

PO-1050
(5/69)

UNITED STATES PATENT OFFICE
CERTIFICATE OF CORRECTION

Patent No. 3,802,346    Dated  April 9, 1974

Inventor(s) John T. Martin

It is certified that error appears in the above-identified patent and that said Letters Patent are hereby corrected as shown below:

Column 5, line 9, insert the following paragraph:
--Although particular embodiments have been chosen to best illustrate the unique aspects and advantages of this invention, it should be clearly understood that the invention is to be limited only by the following claims:--

Signed and sealed this 24th day of September 1974.

(SEAL)
Attest:

McCOY M. GIBSON JR.
Attesting Officer

C. MARSHALL DANN
Commissioner of Patents